United States Patent [19]
Ledvina et al.

[11] Patent Number: 5,690,569
[45] Date of Patent: Nov. 25, 1997

[54] SINGLE PIECE REINFORCED CHAIN GUIDE

[75] Inventors: Timothy J. Ledvina, Groton; Stanley K. Dembosky, Ithaca, both of N.Y.

[73] Assignee: Borg-Warner Automotive, Inc., Sterling Heights, Mich.

[21] Appl. No.: 643,936

[22] Filed: Mar. 13, 1996

[51] Int. Cl.⁶ .......................................... F16H 7/08
[52] U.S. Cl. ...................... 474/111; 474/140; 264/255
[58] Field of Search .................... 474/111, 119, 474/140; 264/255

[56] References Cited

U.S. PATENT DOCUMENTS

| | | | |
|---|---|---|---|
| 4,080,842 | 3/1978 | Capeyre et al. | 474/228 X |
| 4,832,664 | 5/1989 | Groger et al. | 474/111 |
| 5,120,279 | 6/1992 | Rabe | 474/197 X |
| 5,176,580 | 1/1993 | Stamm et al. | 474/133 X |

FOREIGN PATENT DOCUMENTS

| | | |
|---|---|---|
| 52-6419 | 2/1977 | Japan . |
| 58-3142 | 1/1983 | Japan . |
| 63-3185 | 1/1988 | Japan . |
| 3-2952 | 1/1991 | Japan . |
| 4-119652 | 10/1992 | Japan . |
| 4-119654 | 10/1992 | Japan . |
| 5-42798 | 6/1993 | Japan . |
| 6-40357 | 10/1994 | Japan . |

*Primary Examiner*—Roger J. Schoeppel
*Attorney, Agent, or Firm*—Hugh A. Abrams, Esq.; Greg Dziegielewski, Esq.

[57] ABSTRACT

A single component tensioner arm or chain guide for a power transmission chain formed by injection molding which integrally forms both a carrier portion and a slide portion. The one piece tensioner arm is constructed of a polymer material containing graphite or aramid fibers to increase structural rigidity.

5 Claims, 1 Drawing Sheet

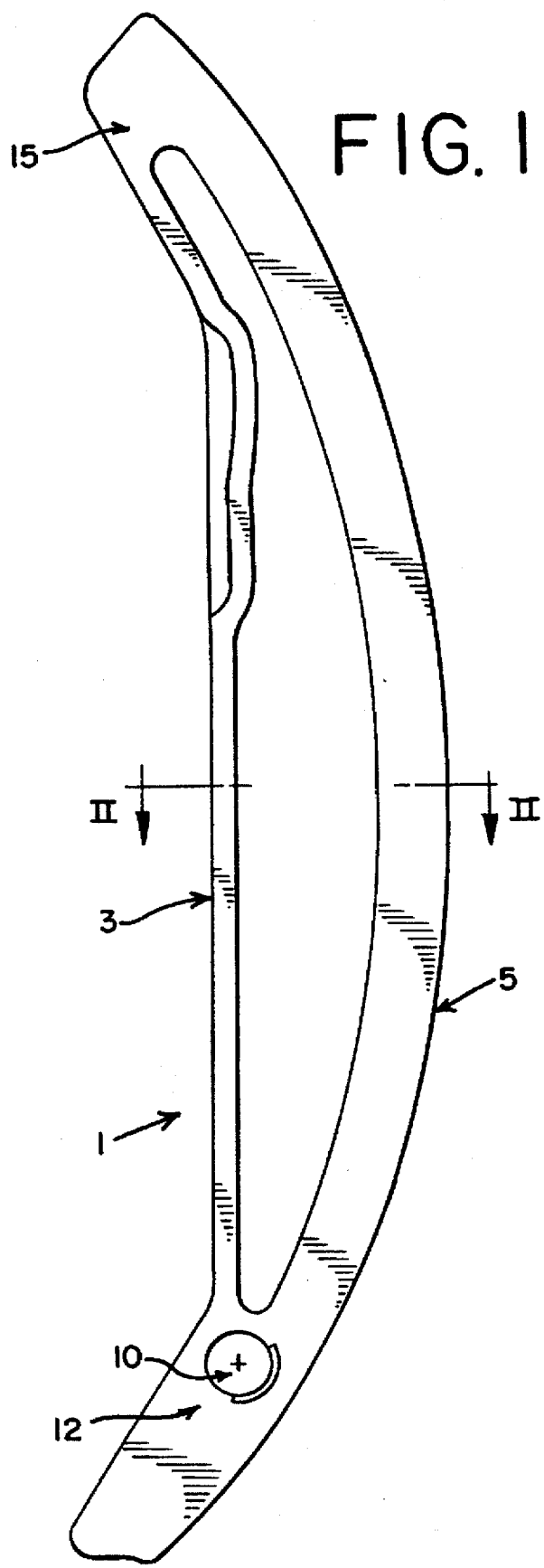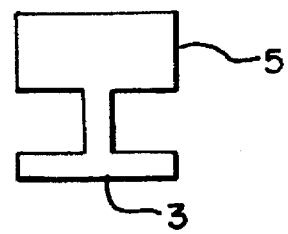

SINGLE PIECE REINFORCED CHAIN GUIDE

BACKGROUND OF THE INVENTION

This invention relates to a tensioner arm or guide rail for tensioning or guiding drive chains and more particularly to a single component tensioner arm or guide rail that uses graphite or aramid fiber reinforcement for structural rigidity. The tensioner arm or guide rail of the preferred embodiment of the present invention is designed for use as a chain tensioner or chain guide in an engine timing chain system.

Conventional guide rails of the prior art typically include two components that are produced independently of one another and interconnected by some form of locking device. These guide rails are typically formed of plastic or a metal support with a plastic slide portion.

U.S. Pat. No. 4,832,664 discloses a two piece plastic guide rail that includes a carrier portion formed of a polymer material reinforced with fiberglass fibers and a slideway lining body (the wear face that contacts the chain) formed of unreinforced nylon. Fiberglass fibers are traditionally used to improve the structural properties of injection molded parts, but are known to abraid steel surfaces that come in contact with them. Thus, the fiberglass is used in the carrier portion, but not the slideway that contacts the chain.

Each of these two components is formed progressively in a mold. The carrier and slideway lining body are formed of complementary dovetail cross-sections and interlocked by bent end sections, or a similar meshing arrangement, that prevent relative movement between the two portions.

The guide rails of prior art, such as the guide shown in U.S. Pat. No. 4,832,664, are typically constructed using an injection molding process. The process of injection molding utilizes a mold to form the component. The desired material is placed or injected into the mold and allowed to cure or form. The mold is then removed to reveal the desired component.

The present invention relates to a one piece tensioner arm or guide, formed by injection molding, that uses carbon or aramid fibers for reinforcement. The carbon or aramid fibers do not abraid the steel chain that runs against the tensioner arm or chain guide. The composite fibers also act to dissipate heat that is generated by the friction between the chain and the wear face of the tensioner arm or guide. Thus, the present invention avoids the need for the two separate components of the guide.

SUMMARY OF THE INVENTION

The preferred embodiment of the present invention creates a single component tensioner arm or chain guide formed by injection molding. The one piece tensioner arm uses carbon or aramid fiber reinforcement in a polymer base for structural rigidity.

Other objects, advantages and novel features of the present invention will become apparent from the following detailed description of the invention when considered in conjunction with the accompanying drawings.

BRIEF DESCRIPTION OF THE DRAWINGS

FIG. 1 is a side view of a single component tensioner arm or guide rail of the present invention with an integrally formed carrier and slideway lining body.

FIG. 2 is a cross sectional view of the preferred embodiment of the single component tensioner arm or guide rail of the present invention, with an integrally formed carrier and slideway lining body, manufactured by the injection molding process.

DETAILED DESCRIPTION OF THE PREFERRED EMBODIMENTS

Turning now to the drawings, FIG. 1 depicts the preferred embodiment of the present invention. A tensioner arm or guide rail 1 is used for tensioning or guiding a chain (not shown) along its upper surface. The tensioner arm or guide rail 1 is comprised of an integrally formed carrier portion 3 and a slideway lining body portion 5. The chain (not shown) will slide along the upper surface of the slideway lining body 5 portion of the integrally formed tensioner arm or guide.

The tensioner arm or guide rail is manufactured by an injection molding process. The integrally manufactured tensioner arm or guide rail is formed of a polymer material containing carbon or aramid fibers for reinforcement and structural rigidity. The carbon or aramid fibers do not abraid the steel chain that runs against the tensioner arm or chain guide. The composite fibers also act to dissipate heat that is generated by the friction between the chain and the wear surface of the tensioner arm or guide rail.

In the preferred embodiment, the composition of the material which forms the integral chain guide comprises a formulation of nylon 6/6 resin, which contains approximately 30% carbon fibers. The polymer formulation is known commercially as Celstran N66G30-02-4. Other types of polymer formulations that may be used in the composition include nylon 6/6 resin with 20% to 40% carbon fibers and nylon 6/6 resin with 35% aramid fibers. These polymer formulations are known commercially as Celstran N66K35, Celstran N66C40, DSM J-1/CF/20, and LNP RC-1004. Also, the composition may include a hybrid combination of aramids or carbon in conjunction with the resin.

The polymer formulation is reinforced with carbon or aramid fibers. The preferred amount of graphite in the formulation ranges from 20% to 40%. The preferred amount of carbon fibers is approximately 30%. The preferred amount of aramid fibers is approximately 35%. Other resin binders and fillers are included in the formulation.

The tensioner arm or guide rail is pinned, or otherwise secured, by pin 10 against the engine at point 12. Thus, the pivot point 12 of the tensioner arm or guide rail 1 is the rotation point for the tensioner arm or guide rail. In the tensioner arm embodiment, the opposite end of the tensioner arm 15 is placed against a tensioning device to utilize the component as a chain tensioner arm. Alternatively, both ends of the component may be secured and the component is used as a chain guide.

FIG. 2 depicts a cross sectional view of the preferred embodiment of the tensioner arm or chain guide 1, manufactured by the injection molding process and composed of a single component which integrally forms the carrier portion 3 and slideway lining body portion 5.

As noted above the use of the injection molding process to form the tensioner arm or guide rail provides a method of integrally forming a carrier and slideway lining body into a single component. As a result, no face attachment would be required. The tensioner arm or guide rail itself acts as the wear surface.

In manufacturing one embodiment of the guide of the present invention, a formulation of 80% nylon and 20% carbon fiber is prepared and heated to 540° F. After thorough mixing of the components, the liquid formulation is injected into a mold at 180° F. and allowed to cure. After the component has cured it is removed from the mold. The final component preferably has a hardness of approximately E67 Rockwell and tensile strength of 24 to 28 Kpsi.

Those skilled in the art to which the invention pertains may make modifications and other embodiments employing the principles of this invention without departing from its spirit or essential characteristics, particularly upon the foregoing teachings.

What is claimed is:

1. A guide for a power transmission chain, comprising:

a single rail component which integrally forms a carrier portion and a slide portion, said component being formed of polymer material containing fibers from the group of graphite and aramid, and being manufactured by an injection molding process.

2. The guide of claim 1 wherein the component has a composition consisting essentially of, in volume %:

at least 60% nylon polymer;

at least 20% carbon; and resin fillers being essentially the balance.

3. The guide of claim 1 wherein the component has a composition consisting essentially of, in volume %:

nylon polymer: 60% to 80%;

carbon: 20% to 40%; and resin fillers being essentially the balance.

4. The guide of claim 3 wherein said component has been heated to a temperature above the melting point of the polymer resin before being subject to the injection molding process.

5. The guide of claim 1 wherein the single rail component has a predetermined cross-sectional shape.

* * * * *